(12) United States Patent
Yoshioka et al.

(10) Patent No.: US 11,848,734 B2
(45) Date of Patent: Dec. 19, 2023

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 377 days.

(21) Appl. No.: 17/267,366

(22) PCT Filed: Aug. 10, 2018

(86) PCT No.: PCT/JP2018/030150
§ 371 (c)(1),
(2) Date: Feb. 9, 2021

(87) PCT Pub. No.: WO2020/031387
PCT Pub. Date: Feb. 13, 2020

(65) Prior Publication Data
US 2021/0226683 A1 Jul. 22, 2021

(51) Int. Cl.
*H04B 7/06* (2006.01)
*H04W 72/04* (2023.01)
*H04W 72/0446* (2023.01)
*H04W 72/0453* (2023.01)
*H04W 72/21* (2023.01)

(52) U.S. Cl.
CPC ...... *H04B 7/0626* (2013.01); *H04W 72/0446* (2013.01); *H04W 72/0453* (2013.01); *H04W 72/21* (2023.01)

(58) Field of Classification Search
CPC ... H04L 1/0026; H04L 1/0027; H04L 5/0057; H04W 72/0453; H04W 72/0446; H04W 72/21; H04W 24/10; H04B 7/0626
See application file for complete search history.

(56) References Cited

U.S. PATENT DOCUMENTS

| | | | | |
|---|---|---|---|---|
| 2020/0403758 | A1* | 12/2020 | Song | H04L 5/0048 |
| 2021/0022129 | A1* | 1/2021 | Yuan | H04L 5/0057 |
| 2021/0136768 | A1* | 5/2021 | Kang | H04L 1/00 |
| 2021/0152302 | A1* | 5/2021 | Kwak | H04W 72/542 |
| 2021/0168846 | A1* | 6/2021 | Li | H04L 1/1854 |
| 2021/0274488 | A1* | 9/2021 | Yamamoto | H04W 72/20 |

OTHER PUBLICATIONS

International Search Report issued in PCT/JP2018/030150 dated Sep. 25, 2018 (2 pages).

(Continued)

*Primary Examiner* — Brian D Nguyen
(74) *Attorney, Agent, or Firm* — Osha Bergman Watanabe & Burton LLP

(57) ABSTRACT

To appropriately control a plurality of CSI reports of different types, a user terminal according to one aspect of the present disclosure includes: a transmitting section that transmits channel state information (CSI) reports of different types; and a control section that, when transmission durations of a plurality of the CSI reports overlap, drops a given CSI report according to priority or multiplexes a given CSI report on a given uplink channel, based on a type of each of the plurality of the CSI reports and a type of an uplink channel used for transmission of each of the plurality of the CSI reports.

5 Claims, 10 Drawing Sheets

(56) References Cited

OTHER PUBLICATIONS

Written Opinion of the International Searching Authority issued in PCT/JP2018/030150 dated Sep. 25, 2018 (4 pages).
Ericsson; "Summary of views on CSI reporting v2"; 3GPP TSG-RAN WG1 Meeting #93, R1-1807648; Busan, May 21-25, 2018 (18 pages).
BGPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 18929091.9, dated Feb. 14, 2022 (7 pages).
Intel Corporation; "Multiple UCI types in a PUCCH"; 3GPP TSG RAN WG1 Meeting #93, R1-1806519; Busan, Korea; May 21-25, 2018 (4 pages).
Ericsson; "Corrections and clarifications for CSI reporting"; 3GPP TSG-RAN WG1 Meeting #93, R1-1806216; Busan, Korea; May 21-25, 2018 (19 pages).
Office Action issued in the counterpart Indian Patent Application No. 202137005600, dated Oct. 17, 2022 (6 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In the Universal Mobile Telecommunications System (UMTS) network, the specifications of Long Term Evolution (LTE) have been drafted for the purpose of further increasing high speed data rates, providing lower latency and so on (see Non-Patent Literature 1). Further, the specifications of LTE-A (also referred to as LTE Advanced, LTE Rel. 10, Rel. 11, or Rel. 12) have been drafted for the purpose of further widening a band and increasing the speed in comparison with LTE (also referred to as LTE Rel. 8 or Rel. 9). Succeeding systems of LTE (which are also referred to as, for example, Future Radio Access (FRA), 5th generation mobile communication system (5G), 5G+(plus), New Radio (NR), New radio access (NX), Future generation radio access (FX), LTE Rel. 13, Rel. 14, Rel. 15 or later versions, and so on) are also under study.

In the existing LTE systems (for example, LTE Rel. 8 to Rel. 13), an uplink signal is mapped to appropriate radio resources and transmitted from a UE to an eNB. Uplink user data is transmitted by using an uplink shared channel (Physical Uplink Shared Channel (PUSCH)). When uplink control information (UCI) is transmitted together with uplink user data, the UCI is transmitted by using a PUSCH, whereas when the UCI is transmitted individually, the UCI is transmitted by using an uplink control channel (Physical Uplink Control Channel (PUSCH)).

Channel state information (CSI) included in the UCI is information based on an instantaneous downlink channel state, and is, for example, a channel quality indicator (CQI), a precoding matrix indicator (PMI), a precoding type indicator (PTI), a rank indicator (RI), or the like. The CSI is notified from the UE to the eNB either periodically or aperiodically.

Regarding periodic CSI (P-CSI), the UE periodically transmits CSI, based on a period (cycle) and/or resources notified from a radio base station. Regarding aperiodic CSI (A-CSI), by contrast, the UE transmits CSI in response to a CSI report request (also referred to as a trigger, a CSI trigger, a CSI request, or the like) from a radio base station.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, NR), a CSI report using a configuration different from the configuration of the existing LTE systems (for example, LTE Rel. 13 or earlier) is under study.

For example, a Semi-Persistent CSI (SP-CSI) report, in which the UE reports CSI by using semi-persistently assigned resources, is under study.

In this manner, when a plurality of CSI reports of different types are introduced, it is conceivable that the plurality of CSI reports collide with each other. However, how to deal with such collision is not fully studied yet.

In view of this, an object of the present disclosure is to provide a user terminal and a radio communication method that enable appropriate control of a plurality of CSI reports of different types.

Solution to Problem

A user terminal according to one aspect of the present disclosure includes: a transmitting section that transmits channel state information (CSI) reports of different types; and a control section that, when transmission durations of a plurality of the CSI reports overlap, drops a given CSI report according to priority or multiplexes a given CSI report on a given uplink channel, based on a type of each of the plurality of the CSI reports and a type of an uplink channel used for transmission of each of the plurality of the CSI reports.

Advantageous Effects of Invention

According to one aspect of the present disclosure, a plurality of CSI reports of different types can be appropriately controlled.

DESCRIPTION OF EMBODIMENTS

Figure 1:
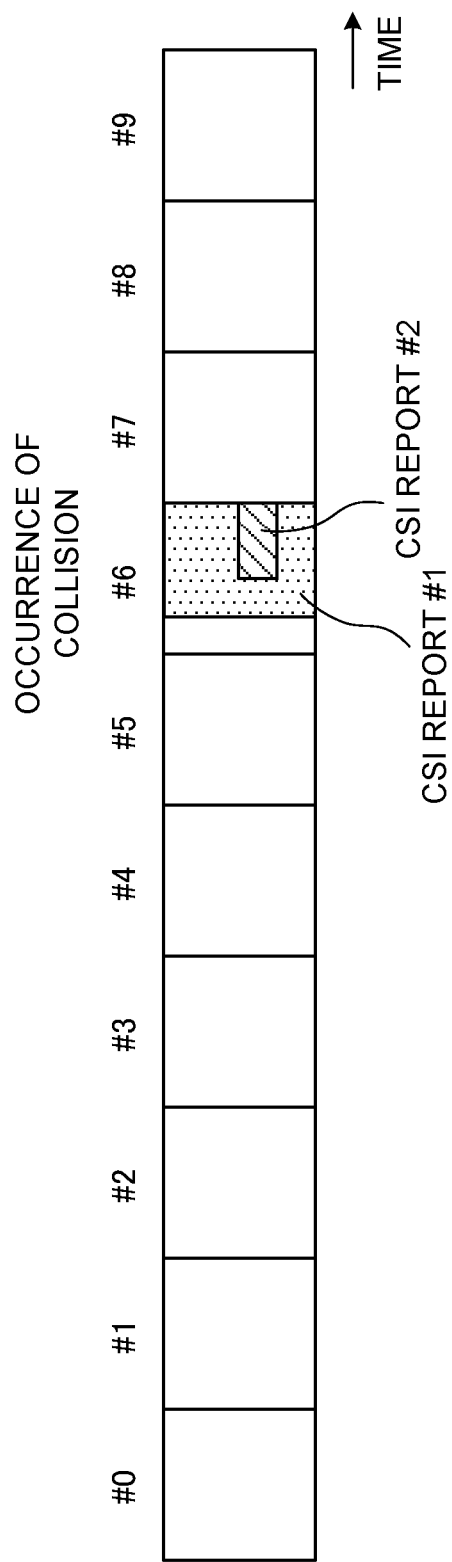
FIG. 1 is a diagram to show an example of a case where two CSI reports collide with each other.

The existing LTE systems (for example, Rel. 10 to Rel. 14) prescribe a reference signal for measuring a channel state in the downlink. Such a reference signal for channel state measurement is also referred to as a Cell-specific Reference Signal (CRS) and a Channel State Information-Reference Signal (CSI-RS), and is a reference signal used to measure CSI used to indicate a channel state, such as a Channel Quality Indicator (CQI), a Precoding Matrix Indicator (PMI), and an Rank Indicator (RI).

A UE feeds back results measured based on the reference signal for channel state measurement to a base station (which may also be a network, an eNB, a gNB, a transmission/reception point, or the like) as channel state information (CSI), at given timing. As a CSI feedback method, a periodic CSI report (P-CSI) and an aperiodic CSI report (A-CSI) are prescribed.

When the UE carries out the P-CSI reporting, the UE gives a P-CSI feedback in a given periodicity (for example, a 5-subframe cycle, a 10-subframe cycle, or the like). The UE transmits P-CSI by using an uplink control channel of a given cell (for example, a primary cell (PCell), a PUCCH cell, and a primary secondary cell (PSCell)).

When there is no transmission of uplink data (for example, a PUSCH) at given timing (given subframe) to carry out the P-CSI reporting, the UE transmits P-CSI by using an uplink control channel (for example, a PUCCH). On the other hand, when there is transmission of uplink data at given timing, the UE can transmit P-CSI by using an uplink shared channel.

When the UE carries out the A-CSI reporting, the UE transmits A-CSI in response to a CSI trigger (CSI request) from the base station. For example, the UE carries out the A-CSI reporting at a given timing (for example, 4 subframes) after reception of the CSI trigger.

The CSI trigger notified from the base station is included in downlink control information (for example, DCI format 0/4) for an uplink scheduling grant (UL grant) that is transmitted by using a downlink control channel. Note that the UL grant may be DCI for scheduling transmission of UL data (for example, a PUSCH) and/or transmission of a UL sounding (measurement) signal.

In accordance with the trigger included in the downlink control information for the UL grant, the UE performs A-CSI transmission by using an uplink shared channel assigned by using the UL grant. When CA is applied, the UE can receive a UL grant (including an A-CSI trigger) for a given cell by using a downlink control channel of another cell.

In the future radio communication systems (also referred to as NR), carrying out the CSI reporting with a configuration different from the configuration of the existing LTE systems is under study.

In the CSI report in NR, a CSI report (SP-CSI report) using semi-persistently assigned resources is supported, as well as the periodic CSI report (P-CSI report) and the aperiodic CSI report (A-CSI report).

Once the UE is assigned resources for the SP-CSI report (which may be referred to as SP-CSI resources), the UE can keep using such assigned resources periodically, unless releases (or deactivation) of the SP-CSI resources are separately assigned.

The SP-CSI resources may be resources configured by using higher layer signaling, or may be resources assigned by using an SP-CSI report activation signal (which may be referred to as a "trigger signal").

Here, for example, the higher layer signaling may be any one or combinations of Radio Resource Control (RRC) signaling, Medium Access Control (MAC) signaling, broadcast information, and the like. For example, the MAC signaling may use MAC control elements (MAC CE (Control Elements)), MAC PDUs (Protocol Data Units), and the like. Here, for example, the higher layer signaling may be any one or combinations of Radio Resource Control (RRC) signaling, Medium Access Control (MAC) signaling, broadcast information, and the like.

For example, information of the SP-CSI resources may include information related to a report periodicity (ReportPeriodicity) and an offset (ReportSlotOffset), and these pieces of information may be expressed in a unit of slot, subframe, or the like. The information of the SP-CSI resources may include a configuration ID (CSI-ReportConfigId), and the configuration ID may specify a type of a CSI report scheme (for example, whether SP-CSI is used or not), and a parameter such as report periodicity. The information of the SP-CSI resources may be referred to as SP-CSI resource configuration, SP-CSI report configuration, or the like.

When the UE receives a given activation signal, for example, the UE can periodically carry out at least one of CSI measurement using a given reference signal (which may be referred to as, for example, an SP-CSI-RS) and the SP-CSI reporting using the SP-CSI resources. When the UE receives a given deactivation signal or when a given timer expires, the UE stops the SP-CSI measurement and/or the report.

The SP-CSI report may be transmitted by using a primary cell (PCell), a primary secondary cell (PSCell), a PUCCH secondary cell (PUCCH SCell), and other cells (for example, a secondary cell), for example.

The SP-CSI report activation/deactivation signal may be notified by using a given signal (for example, MAC signaling (for example, MAC CEs) or physical layer signaling (for example, downlink control information (DCI)).

Note that the SP-CSI report may be transmitted by using one or both of the PUCCH and the PUSCH. Determination as to which channel is used for transmission may be configured by the gNB for the UE by using RRC signaling, may be specified by using MAC CEs or the like, or may be notified by using DCI.

Further, a channel for carrying out the SP-CSI reporting may be determined based on the SP-CSI report activation signal. For example, the SP-CSI report using the PUCCH may be activated by using MAC CEs, and the SP-CSI report using the PUCSH may be triggered by using DCI.

The DCI may be DCI whose cyclic redundancy check (CRC) bits are masked with a radio network temporary identifier (RNTI) for the SP-CSI report.

When a plurality of SP-CSI resources are configured for the UE, the SP-CSI report activation signal may include information indicating one of the plurality of SP-CSI resources. In this case, the UE can determine resources to be used for the SP-CSI report, based on the SP-CSI report activation signal.

In this manner, in NR, a plurality of CSI reports of different types (the periodic CSI (P-CSI), the aperiodic CSI (A-CSI), and the semi-persistent CSI (SP-CSI)) are supported. The UL channels to be applied to transmission of each CSI report are also configured to be different from one another. For example, the PUCCH is applied to transmission of the P-CSI, the PUSCH is applied to transmission of the A-CSI, and the PUCCH or the PUSCH is applied to transmission of the SP-CSI. Note that the PUSCH may be applied to transmission of the A-CSI.

In this manner, when a plurality of CSI reports of different types are introduced, it is conceivable that the plurality of CSI reports collide with each other. However, how to deal with such collision is not fully studied yet. There is a problem that throughput may be reduced, for example, unless a method of appropriately dealing with the collision is established.

In view of this, the inventors of the present invention focused on that there are a plurality of types of CSI reports and a plurality of types of UL channels used for the CSI reports, and came up with the idea of controlling operation at the time of collision of the CSI reports, based on at least one of the types of the CSI reports and the types of the uplink channels used for transmission.

The embodiment according to the present disclosure will be described below in detail with reference to the drawings. A radio communication method according to each embodiment may be independently applied or may be applied in combination.

In the present specification, "collision" refers to a situation in which a plurality of signals and/or channels are transmitted (scheduled) on the same time resources (for example, at least one of the same slot and symbol), but this is not restrictive. For example, "collision" may refer to a situation in which a plurality of signals and/or channels are transmitted on radio resources on which at least time resources are overlapped (for example, overlapping time and frequency resources).

Note that the unit of the time resources is not limited to a slot, and may be interpreted as, for example, a mini-slot, a symbol, or a subframe instead.

<CSI Report Control>

Operation when a plurality of CSI reports collide with each other will be described below. As one example, the following description takes an example of a case where two CSI reports collide with each other, but the operation may similarly apply to a case where three or more CSI reports collide with each other.

FIG. 1 shows an example of a case where two CSI reports collide with each other. The PUSCH is applied to transmission of CSI report #1 (for example, A-CSI), the PUCCH is applied to transmission of CSI report #2 (for example, P-CSI), and the P-CSI transmitted on the PUCCH and the A-CSI transmitted on the PUSCH collide with each other in subframe #6.

Other than the above case, a plurality of CSI reports may also collide with each other. For example, when the SP-CSI report transmitted by using the PUSCH is activated, P-CSI transmitted on the PUCCH and SP-CSI transmitted on the PUSCH may collide with each other. Further, when the SP-CSI report using the PUCCH is activated, SP-CSI transmitted on the PUCCH and the SP-CSI transmitted on the PUSCH may collide with each other. Further, when pieces of CSI of the same type are transmitted on the PUCCH, such a plurality of pieces of CSI of the same type may collide with each other. When pieces of CSI of different types are transmitted on the PUCCH, such a plurality of pieces of CSI of different types may collide with each other.

When a plurality of CSI reports collide with each other, it is conceivable to employ a scheme in which the plurality of CSI reports are multiplexed and transmitted, and a scheme in which all or a part of the CSI reports is dropped and not transmitted. For the UE, a multi-CSI-PUCCH resource can be configured by using a higher layer parameter, and when a plurality of CSI reports transmitted by using the PUCCH collide with each other, the plurality of colliding CSI reports can be transmitted by using the multi-CSI-PUCCH resource. When a plurality of CSI reports collide with each other, the UE can drop a CSI report of a low priority and transmit a CSI report of a high priority, according to a priority rule.

In the present embodiment, when transmission durations of a plurality of CSI reports overlap, a given CSI report is dropped according to priority or is multiplexed on a given uplink channel, based on the type of each CSI report and the type of the uplink channel used for transmission of each CSI report.

First, dropping of a CSI report will be described in detail. When at least one of a plurality of CSI reports with overlapped transmission durations includes an A-CSI report using the PUSCH or an SP-CSI report, the UE drops a given CSI report according to priority. Each CSI report is associated with its priority. As the priority, a value depending on a type of a CSI report can be configured. Alternatively, the UE may be configured to drop a given CSI report according to priority when at least one of a plurality of CSI reports with overlapped transmission durations includes an A-CSI report using the PUCCH.

A specific priority calculation formula can be defined as in the following formula, including a parameter y depending on a type of a CSI report.

$$Pri_{CSI}=(y,k,c,s)=2 \cdot N_{Cells} \cdot Ms \cdot y + N_{Cells} \cdot Ms \cdot k + Ms \cdot c + s$$

Here, y=0 when the A-CSI report is transmitted on the PUSCH. y=1 when the SP-CSI report is transmitted on the PUSCH. y=2 when the SP-CSI report is transmitted on the PUCCH. y=3 when the P-CSI report is transmitted on the PUCCH.

Moreover, k=0 when the CSI report includes L1-RSRP. k=1 when the CSI report does not include L1-RSRP. "c" represents a servin cell index. $N_{cells}$ represents a value of a maximum number of serving cells notified by using a higher layer parameter (for example, maxNrofServingCells). "s" represents an ID for identifying a measurement report configuration notified by using a higher layer parameter (for example, reportConfigID). "Ms" represents a value of the number of configuration CSI reports notified by using a higher layer parameter (for example, maxNrofCSI-Report-Configurations).

For example, when the plurality of colliding CSI reports include an A-CSI report transmitted on the PUSCH, a CSI report is dropped according to priority that is based on the above formula. Specifically, dropping operation is performed as follows.

Figure 2:
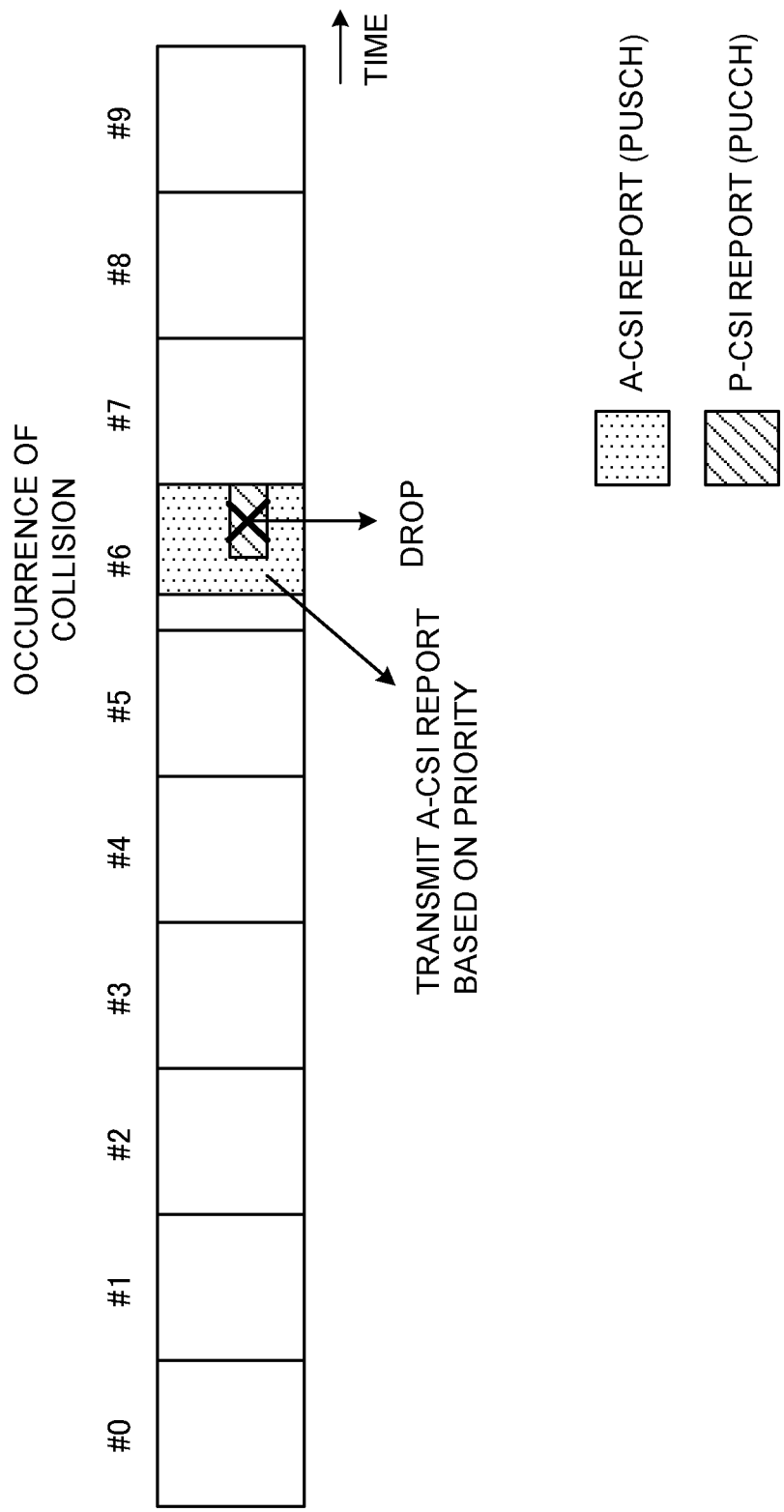
FIG. 2 is a diagram to show an example of a case where a P-CSI report transmitted by using a PUCCH and a P-CSI report transmitted by using a PUSCH collide with each other.

As shown in FIG. 2, when an A-CSI report on the PUSCH and a P-CSI report on the PUCCH (or an SP-CSI report on the PUCCH) collide with each other, operation is performed so that the P-CSI report on the PUCCH (or the SP-CSI report on the PUCCH) is dropped. Moreover, the A-CSI report is fed back by using the PUSCH.

When an A-CSI report using the PUSCH and an SP-CSI report using the PUSCH collide with each other, operation is performed so that the SP-CSI report on the PUSCH is dropped. Moreover, the A-CSI report is fed back by using the PUSCH.

When an SP-CSI report using the PUSCH and a P-CSI report using the PUCCH (or an SP-CSI report on the PUCCH) collide with each other, operation is performed so that the P-CSI report on the PUCCH (or the SP-CSI report on the PUCCH) is dropped. Moreover, the SP-CSI report is fed back by using the PUSCH.

When A-CSI using the PUSCH and SP-CSI using the PUSCH collide with each other, operation is performed so that the SP-CSI report on the PUSCH is dropped. Moreover, the A-CSI report is fed back by using the PUSCH.

Figure 3:
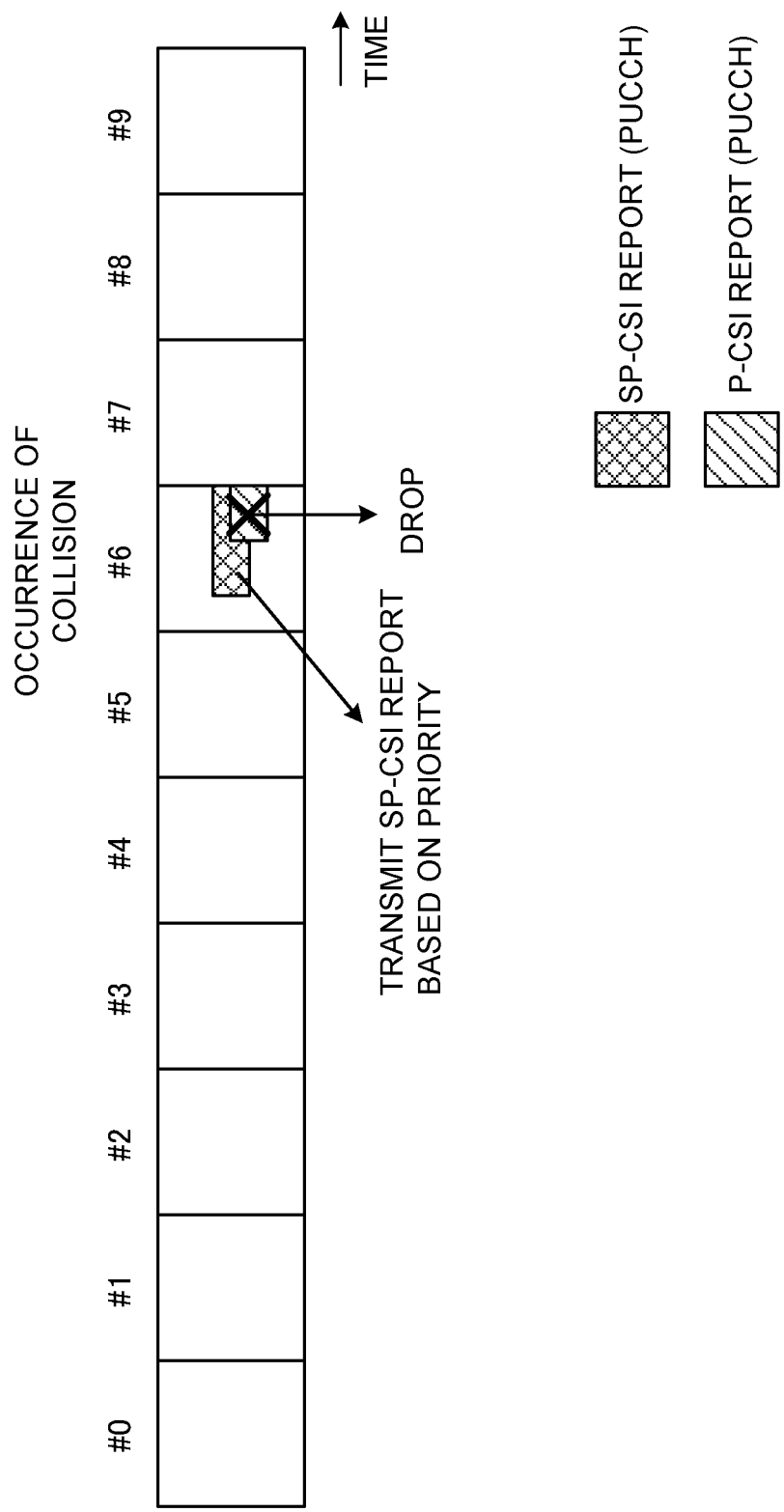
FIG. 3 is a diagram to show an example of a case where a P-CSI report transmitted by using a PUCCH and an SP-CSI report transmitted by using a PUCCH collide with each other.

When a plurality of CSI reports with overlapped transmission durations are CSI reports of different types using the PUCCH, any one of the CSI reports is dropped according to priority. For example, as shown in FIG. 3, when P-CSI using the PUCCH and SP-CSI using the PUCCH collide with each other, operation is performed so that the P-CSI report on the PUCCH is dropped. Moreover, the SP-CSI is fed back by using the PUCCH.

In this manner, when CSI reports of different types among a plurality of CSI reports using the PUCCH collide with each other, control is performed so that any one of the CSI reports is dropped. Consequently, a CSI report of a type having a high priority can be accurately reported.

Multiplexing of a CSI report will be described in detail. When a plurality of CSI reports with overlapped transmission durations are CSI reports of the same type using the PUCCH, the user terminal multiplexes the plurality of CSI reports on the PUCCH. When a multi-CSI-PUCCH resource is configured by using a higher layer parameter (multi-CSI-PUCCH resource list), the user terminal can multiplex the plurality of CSI reports on the multi-CSI-PUCCH resource.

For example, when both of two colliding CSI reports are P-CSI reports transmitted on the PUCCH (y=3), those two P-CSI reports are multiplexed on the multi-CSI-PUCCH resource on the condition that the two P-CSI reports can be multiplexed on the multi-CSI-PUCCH resource, even when the parameters other than "y" in the above priority calculation formula, i.e., k, c, and s, are different between the two CSI reports. Moreover, the P-CSI report is fed back by using the PUCCH.

Figure 4:
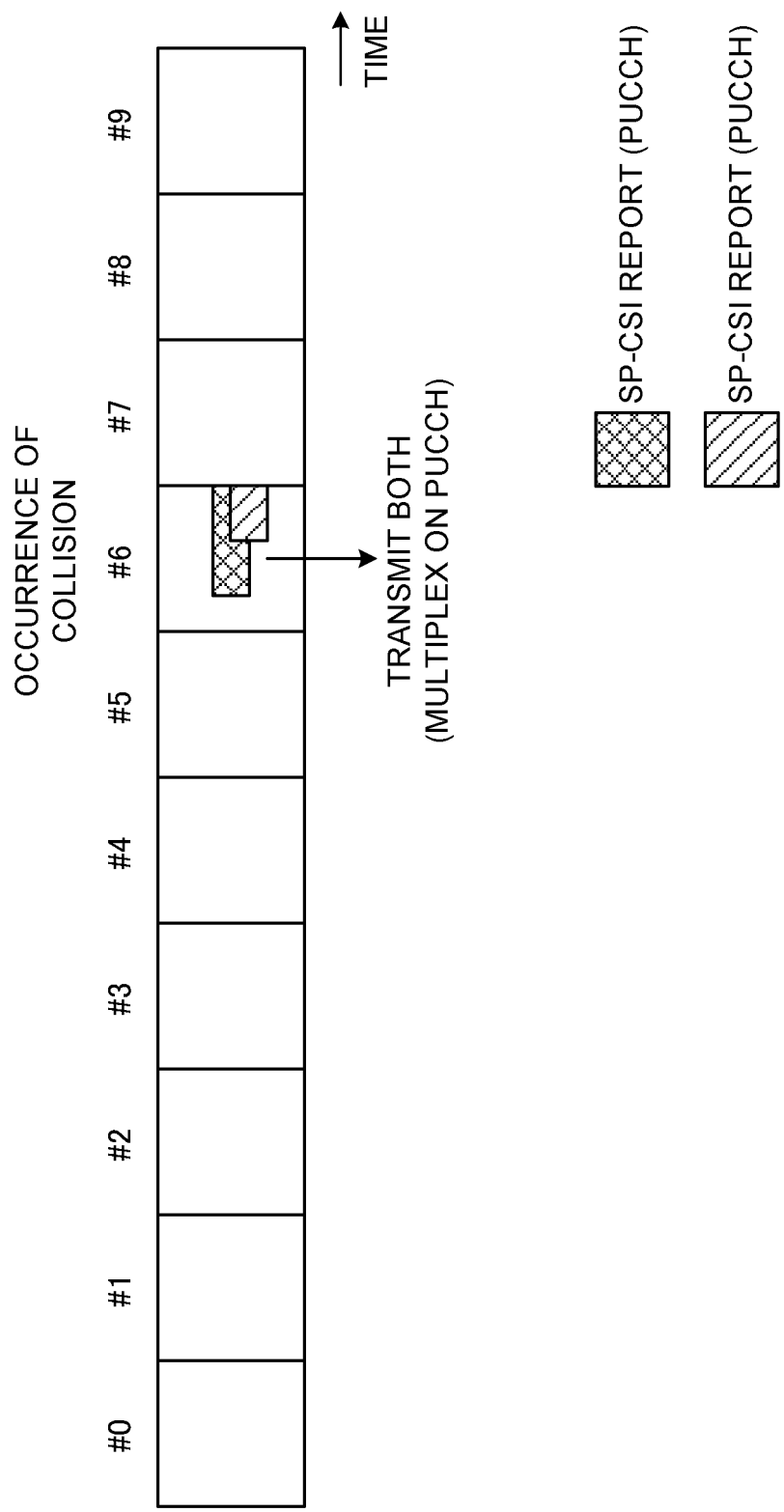
FIG. 4 is a diagram to show an example of a case where an SP-CSI report transmitted by using a PUCCH and an SP-CSI report transmitted by using a PUCCH collide with each other.

Further, as shown in FIG. 4, when both of two colliding CSI reports are SP-CSI reports transmitted on the PUCCH (y=2), those two SP-CSI reports are multiplexed on the multi-CSI-PUCCH resource on the condition that the two SP-CSI reports can be multiplexed on the multi-CSI-PUCCH resource, and are fed back, even when the parameters other than "y" in the above priority calculation formula, i.e., k, c, and s, are different between the two CSI reports.

When CSI reports of the same type among a plurality of CSI reports using the PUCCH collide with each other, control is performed so that both of the CSI reports are multiplexed. Consequently, as many CSI reporting as possible can be carried out. This configuration enables more accurate selection of a transmission scheme depending on CSI.

When a plurality of CSI reports to be multiplexed on the PUCCH resources (for example, the multi-CSI-PUCCH resource) do not satisfy a given condition (for example, when a coding rate is higher than a given value), a part of the CSI reports may be dropped. In this case, as for the CSI report to be dropped, a CSI report having a larger value in the above priority calculation formula is dropped. In this manner, even when CSI reports can be simultaneously transmitted based on their types or the like, such simultaneous transmission may not be allowed unless a given condition is satisfied, and this can prevent deterioration in communication quality.

(Radio Communication System)

Hereinafter, a structure of a radio communication system according to the embodiment of the present disclosure will be described. In the radio communication system, communication is performed by using at least one or a combination of the radio communication methods illustrated in the above embodiment.

Figure 5:
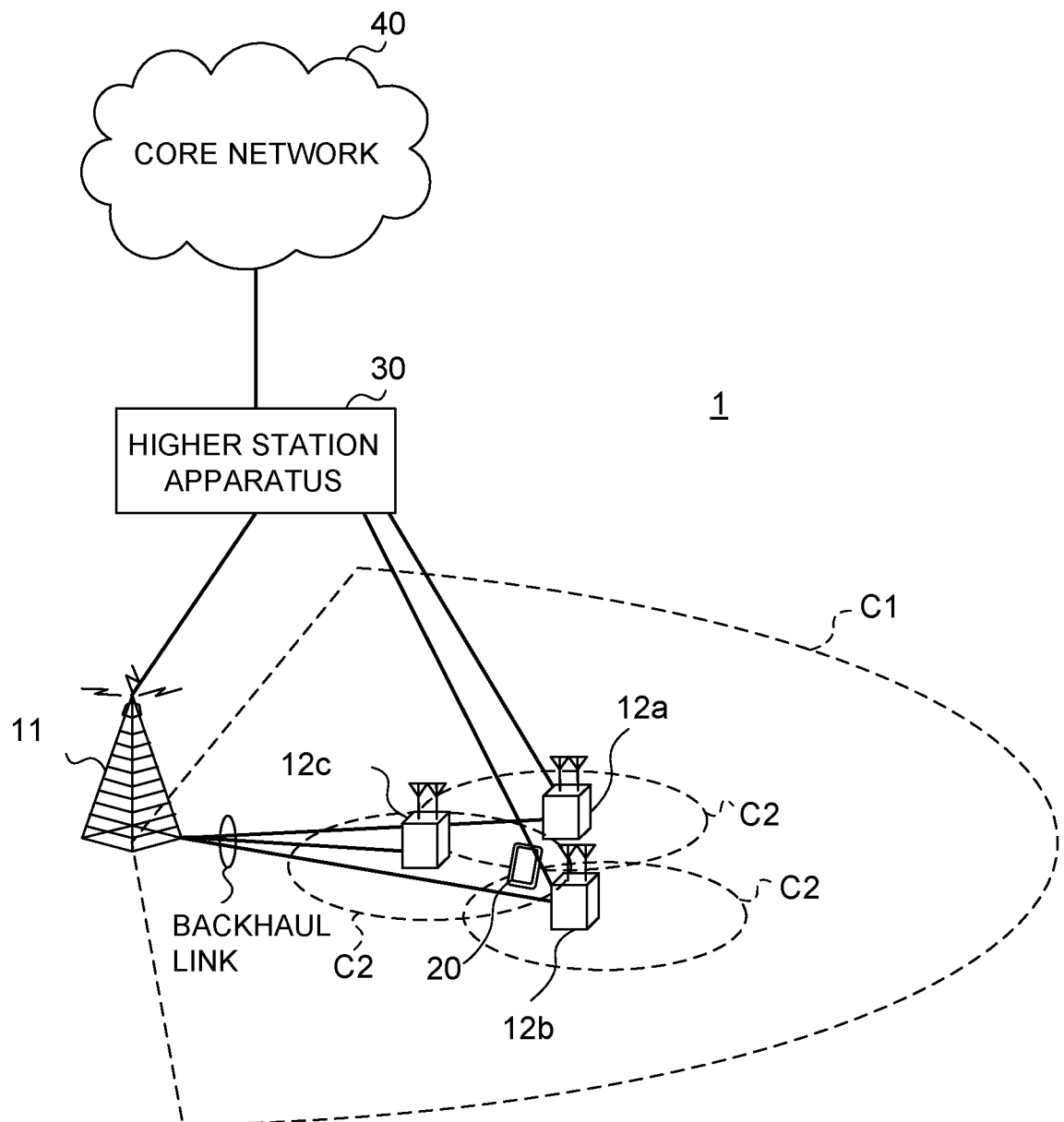
FIG. 5 is a diagram to show an example of a schematic structure of a radio communication system according to one embodiment.

FIG. 5 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "Long Term Evolution (LTE)," "LTE-Advanced (LTE-A)," "LTE-Beyond (LTE-B)," "SUPER 3G," "IMT-Advanced," "4th generation mobile communication system (4G)," "5th generation mobile communication system (5G)," "New Radio (NR)," "Future Radio Access (FRA)," "New-RAT (Radio Access Technology)," and so on, or may be referred to as a system implementing these.

The radio communication system 1 may support dual connectivity between a plurality of Radio Access Technologies (RATS) (multi-RAT dual connectivity (MR-DC). MR-DC may include LTE-NR dual connectivity (E-UTRA-NR Dual Connectivity (EN-DC)) in which an LTE (E-UTRA) base station (eNB) serves as a master node (MN) and an NR base station (gNB) serves as a secondary node (SN), NR-LTE dual connectivity (NR-E-UTRA Dual Connectivity (NE-DC)) in which an NR base station (gNB) serves as an MN and an LTE (E-UTRA) base station (eNB) serves as an SN, or the like.

The radio communication system 1 includes a base station 11 that forms a macro cell C1 of a relatively wide coverage, and base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the base station 11 and the base stations 12. It is assumed that the user terminals 20 use the macro cell C1 and the small cells C2 at the same time by means of CA or DC. The user terminals 20 can apply CA or DC by using a plurality of cells (CCs) (for example, five or less CCs or six or more CCs).

Between the user terminals 20 and the base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the base stations 12, a carrier of a relatively high frequency band (for example, 3.5 GHz, 5 GHz, and so on) and a wide bandwidth may be used, or the same carrier as that used between the user terminals 20 and the base station 11 may be used. Note that the structure of the frequency band for use in each base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a given signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on.

For example, if given physical channels use different subcarrier spacings of the OFDM symbols constituted and/or different numbers of the OFDM symbols, it may be referred to as that the numerologies are different.

A wired connection (for example, means in compliance with the Common Public Radio Interface (CPRI) such as an optical fiber, an X2 interface and so on) or a wireless connection may be established between the base station 11 and the base stations 12 (or between two base stations 12).

The base station 11 and the base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each base station 12 may be connected with the higher station apparatus 30 via the base station 11.

Note that the base station 11 is a base station having a relatively wide coverage, and may be referred to as a "macro base station," a "central node," an "eNodeB (eNB)," a "transmitting/receiving point" and so on. The base stations 12 are base stations having local coverages, and may be referred to as "small base stations," "micro base stations," "pico base stations," "femto base stations," "Home eNodeBs (HeNBs)," "Remote Radio Heads (RRHs)," "transmitting/receiving points" and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (Physical Downlink Shared Channel (PDSCH), which is used by each user terminal 20 on a shared basis, a broadcast channel (Physical Broadcast Channel (PBCH)), downlink L1/L2 control channels and so on, are used as downlink channels. User data, higher layer control information, System Information Blocks (SIBs) and so on are communicated on the PDSCH. The Master Information Blocks (MIBs) are communicated on the PBCH.

The downlink L1/L2 control channels include at least one of a downlink control channel (a Physical Downlink Control Channel (PDCCH) and/or an Enhanced Physical Downlink Control Channel (EPDCCH)), a Physical Control Format Indicator Channel (PCFICH), and a Physical Hybrid-ARQ Indicator Channel (PHICH). Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of Hybrid Automatic Repeat reQuest (HARQ) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on are used as uplink channels. User data, higher layer control information and so on are communicated on the PUSCH. In addition, radio link quality information (Channel Quality Indicator (CQI)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Base Station>

Figure 6:
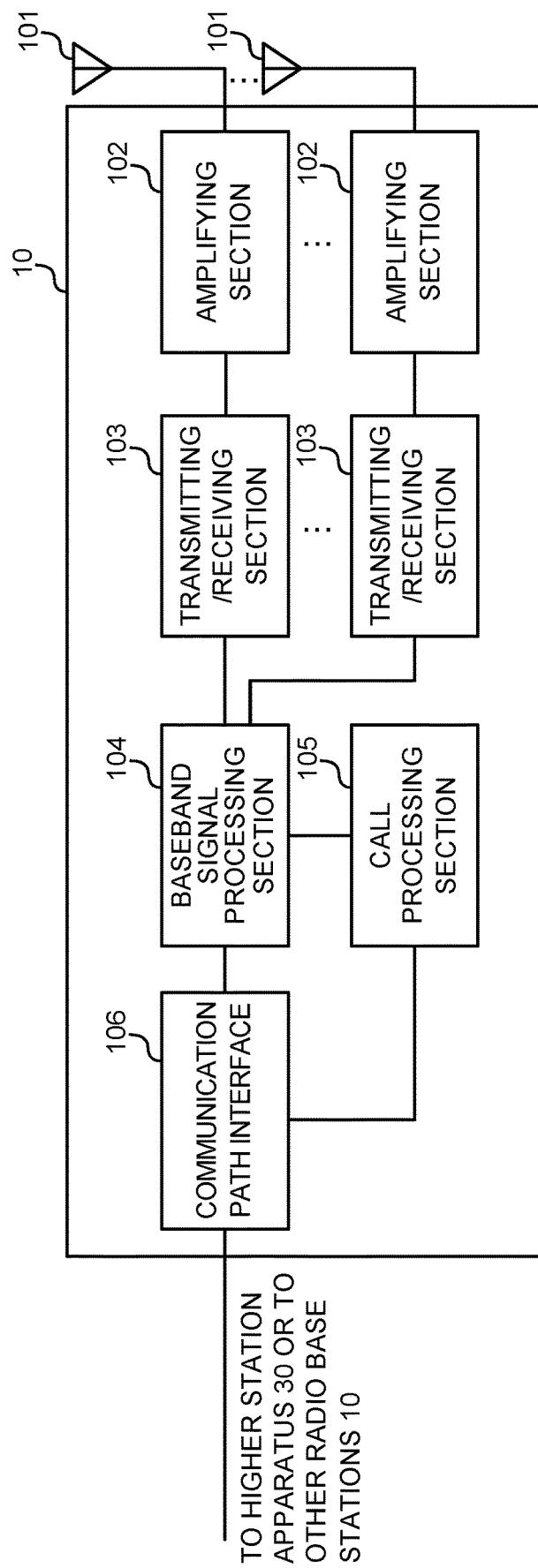
FIG. 6 is a diagram to show an example of an overall structure of a base station according to one embodiment.

FIG. 6 is a diagram to show an example of an overall structure of the base station according to one embodiment. A base station 10 includes a plurality of transmitting/receiving antennas 101, amplifying sections 102, transmitting/receiving sections 103, a baseband signal processing section 104, a call processing section 105 and a communication path interface 106. Note that the base station 10 may be configured to include one or more transmitting/receiving antennas 101, one or more amplifying sections 102 and one or more transmitting/receiving sections 103.

User data to be transmitted from the base station 10 to the user terminal 20 by the downlink is input from the higher station apparatus 30 to the baseband signal processing section 104, via the communication path interface 106.

In the baseband signal processing section 104, the user data is subjected to transmission processes, such as a Packet Data Convergence Protocol (PDCP) layer process, division and coupling of the user data, Radio Link Control (RLC) layer transmission processes such as RLC retransmission control, Medium Access Control (MAC) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the base station 10, manages the radio resources and so on.

The communication path interface 106 transmits and/or receives signals to and/or from the higher station apparatus 30 via a given interface. The communication path interface 106 may transmit and/or receive signals (backhaul signaling) with other base stations 10 via an inter-base station interface (for example, an optical fiber in compliance with the Common Public Radio Interface (CPRI) and an X2 interface).

Note that the transmitting/receiving sections 103 may further include an analog beamforming section that performs analog beamforming. The analog beamforming section can be constituted with an analog beamforming circuit (for example, a phase shifter or a phase shifting circuit) or analog beamforming apparatus (for example, a phase shifting device) that can be described based on general understanding of the technical field to which the present disclosure pertains. For example, the transmitting/receiving antennas 101 can be constituted with array antennas. The transmitting/receiving sections 103 may be configured to be capable of employing single BF, multi-BF, or the like.

The transmitting/receiving sections 103 may transmit a signal by using a transmit beam, or may receive a signal by using a receive beam. The transmitting/receiving sections 103 may transmit and/or receive a signal by using a given beam that is determined by the control section 301.

The transmitting/receiving sections 103 may receive various pieces of information described in each embodiment above from the user terminal 20, and/or transmit those pieces of information to the user terminal 20.

Figure 7:
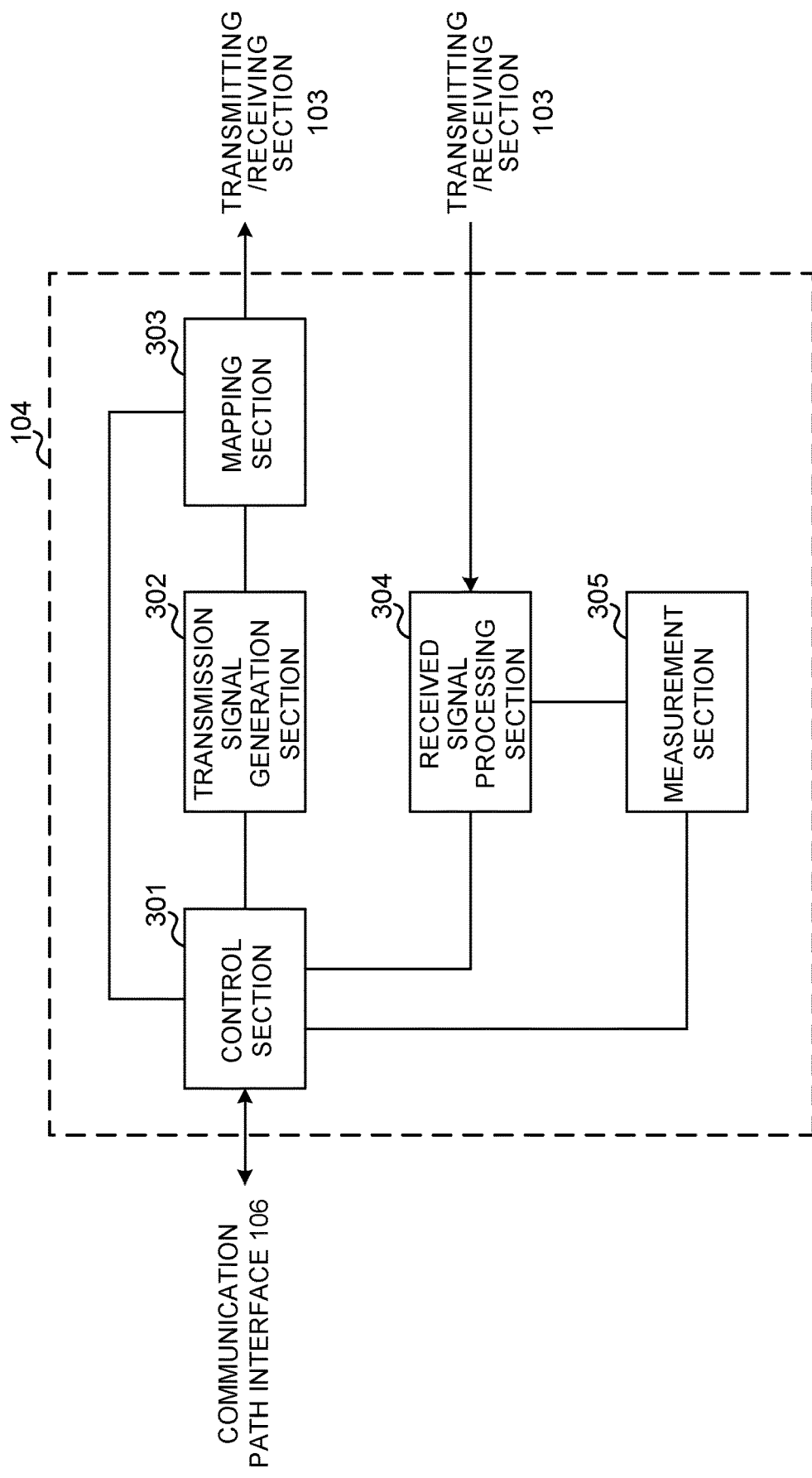
FIG. 7 is a diagram to show an example of a functional structure of the base station according to one embodiment.

FIG. 7 is a diagram to show an example of a functional structure of the base station according to one embodiment. Note that, the present example primarily shows functional blocks that pertain to characteristic parts of the present embodiment, and it is assumed that the base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the base station 10, and some or all of the structures do not need to be included in the baseband signal processing section 104.

The control section (scheduler) 301 controls the whole of the base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS/SSS), a downlink reference signal (for example, CRS, CSI-RS, DMRS), and so on.

The control section 301 may perform control of forming a transmit beam and/or a receive beam by using digital BF (for example, precoding) of the baseband signal processing section 104 and/or analog BF (for example, phase rotation) of the transmitting/receiving sections 103.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing, modulation processing, and the like are performed in accordance with a coding rate, modulation scheme, or the like determined based on channel state information (CSI) from each user terminal 20. Various types of CSI reports are received via the PUCCH and the PUSCH.

The mapping section 303 maps the downlink signals generated in the transmission signal generation section 302 to given radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform Radio Resource Management (RRM) measurement, Channel State Information (CSI) measurement, and so on, based on the received signal. The measurement section 305 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 301.

<User Terminal>

Figure 8:
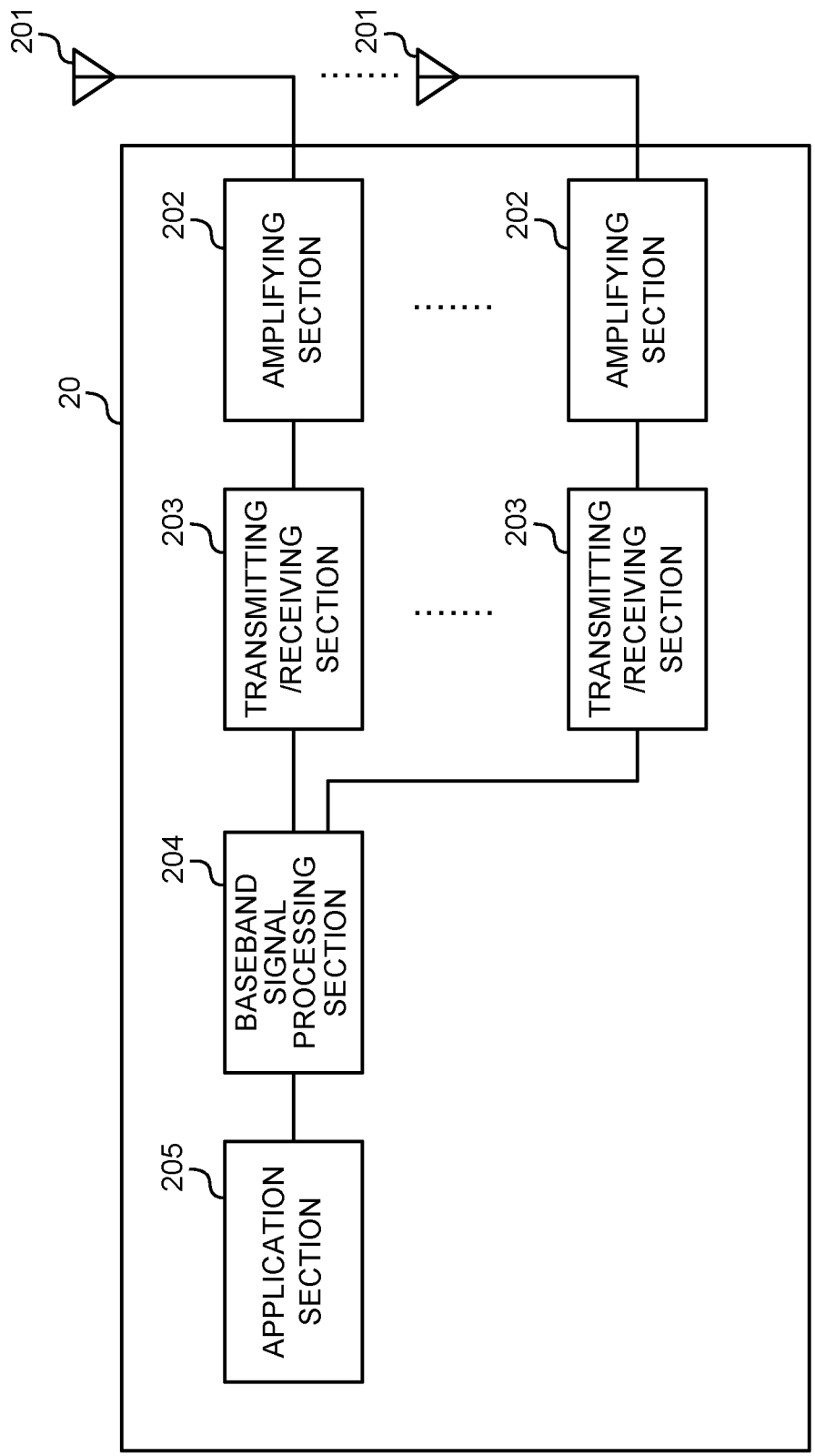
FIG. 8 is a diagram to show an example of an overall structure of a user terminal according to one embodiment.

FIG. 8 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 transmit channel state information (CSI) reports of different types by using the PUSCH or the PUCCH.

Figure 9:
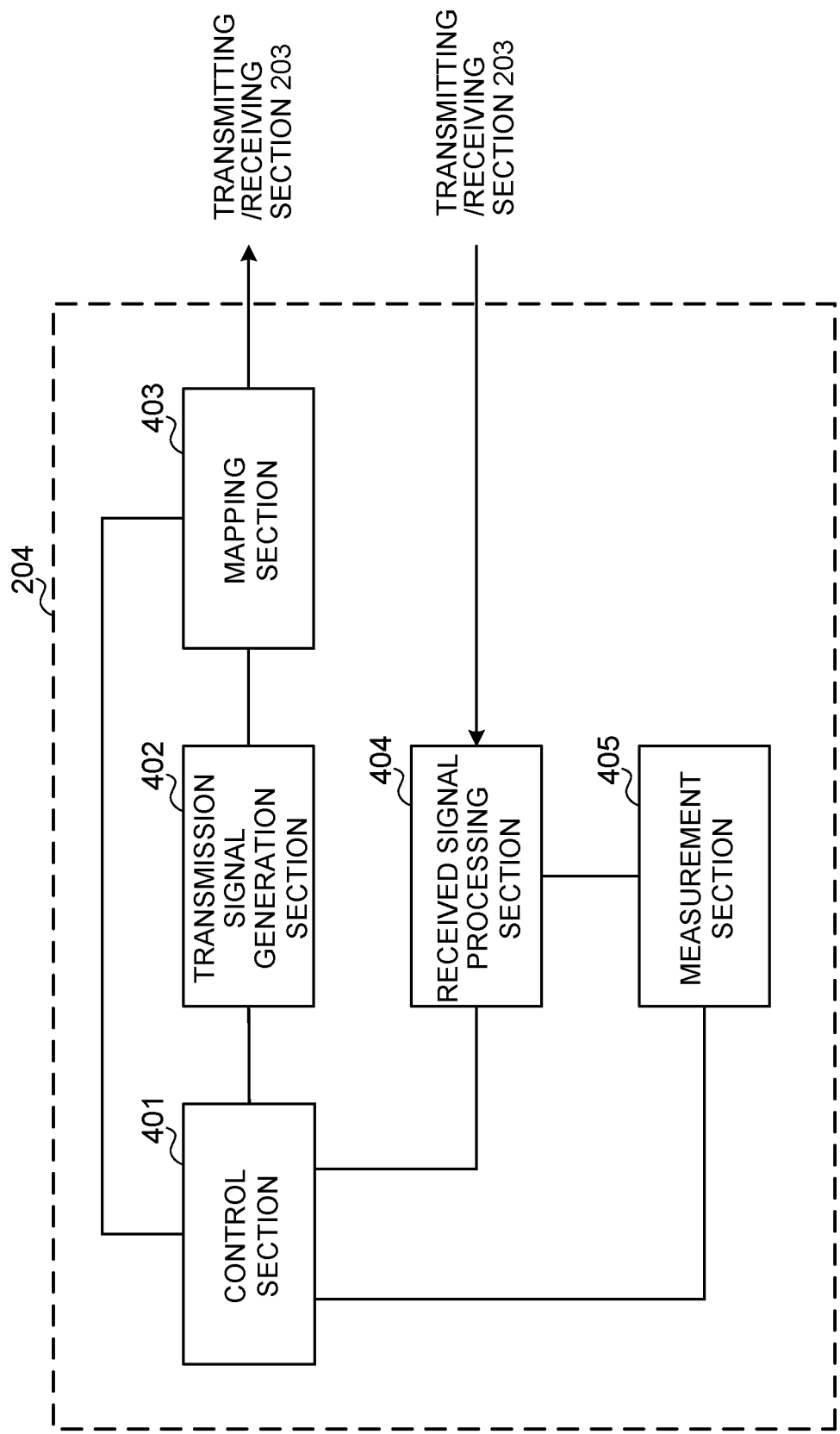
FIG. 9 is a diagram to show an example of a functional structure of the user terminal according to one embodiment.

FIG. 9 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the base station 10, from the received signal processing section 404. The control section 401 controls generation of an uplink control signal and/or an uplink data signal, based on the results of determining necessity or not of retransmission control to a downlink control signal and/or a downlink data signal.

When transmission durations of a plurality of CSI reports overlap, the control section 401 drops a given CSI report according to priority or multiplexes a given CSI report on a given uplink channel, based on the type of each CSI report and the type of the uplink channel used for transmission of each CSI report.

When at least one of a plurality of CSI reports with overlapped transmission durations includes an A-CSI report using the PUSCH or an SP-CSI report, the control section 401 drops a given CSI report according to priority.

When a plurality of CSI reports with overlapped transmission durations include a P-CSI report using the PUCCH and an SP-CSI report, the control section 401 drops a given CSI report according to priority.

When a plurality of CSI reports with overlapped transmission durations are CSI reports of the same type using the PUCCH, the control section 401 multiplexes the plurality of CSI reports on the PUCCH resources.

When a coding rate of a plurality of CSI reports to be multiplexed on the PUCCH is higher than a given value, the control section 401 drops a part of the CSI reports. The CSI report to be dropped is determined according to priority.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (P-CSI, A-CSI, SP-CSI), and so on, based on commands from the control section 401. The transmission signal generation section 402 generates uplink data signals, based on commands from the control section 401. For example, when a UL grant is included in a downlink control signal that is reported from the base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401. The transmitting/receiving sections 203 may transmit a BFRQ, a PBFRQ, or the like to the base station 10.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but the functions are by no means limited to these. For example, the functional block (components) to implement a function of transmission may be referred to as a "transmitting section (transmitting unit)," a "transmitter," and the like. The method for implementing each component is not particularly limited as described above.

Figure 10:
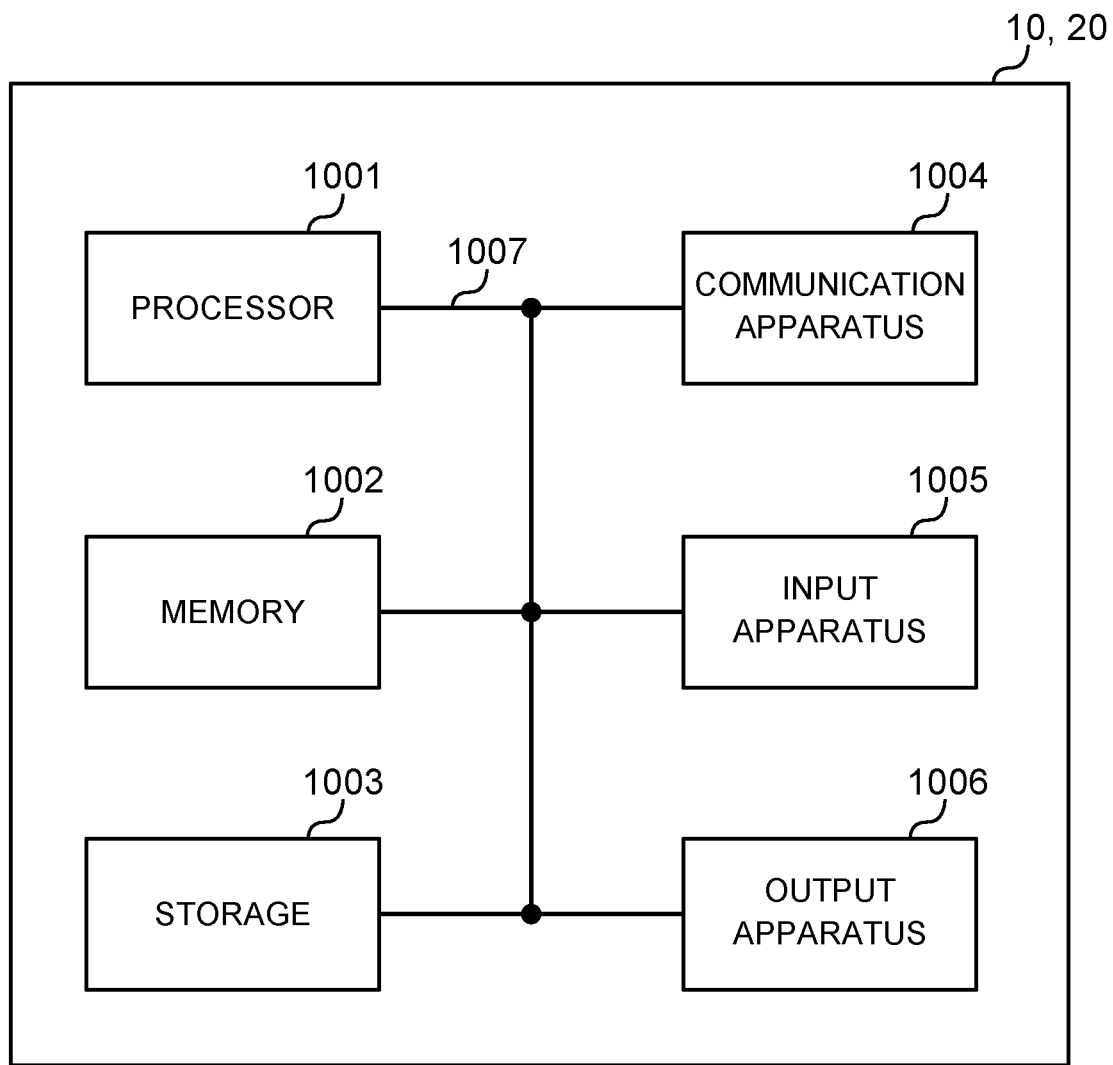
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. In the transmitting/receiving section(s) 103, a transmitting section 103a and a receiving section 103b can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application-Specific Integrated Circuit (ASIC), a Programmable Logic Device (PLD), an Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of durations (frames) in the time domain. Each of one or a plurality of durations (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter duration than 1 ms (for example, 1 to 13 symbols), or may be a longer duration than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, codewords, and so on, or may be the unit of processing in scheduling, link adaptation, and so on. Note that, when TTIs are given, the time interval (for example, the number of symbols) to which transport blocks, code blocks, codewords, and so on are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (Physical Uplink Control Channel (PUCCH), Physical Downlink Control Channel (PDCCH), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure may be used interchangeably.

In the present disclosure, the terms such as "precoding," a "precoder," a "weight (precoding weight)," "quasi-co-location (QCL)," a "transmit power," "phase rotation," an "antenna port," an "antenna port group," a "layer," "the number of layers," a "rank," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms such as "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base station 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GW), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these, for example. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as used in the present disclosure may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, and the like, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor, wherein if transmission durations of a plurality of channel state information (CSI) reports overlap, then the processor determines whether the plurality of CSI reports are multiplexed based on a report type of each CSI report and an uplink channel type used in transmission of each CSI report; and
a transmitter that transmits at least one of the plurality of CSI reports,
wherein if the plurality of CSI reports are CSI reports of the same type that utilize a Physical Uplink Control Channel (PUCCH), and if a multi-CSI-PUCCH resource list is configured by a higher layer, then the processor multiplexes the plurality of CSI reports with a PUCCH resource configured by the multi-CSI-PUCCH resource list.

2. The terminal according to claim 1, wherein the processor drops at least one CSI report based on a code rate of the plurality of CSI reports.

3. A radio communication method for a terminal comprising:
- if transmission durations of a plurality of channel state information (CSI) reports overlap, then determining whether the plurality of CSI reports are multiplexed based on a report type of each CSI report and an uplink channel type used in transmission of each CSI report; and
- transmitting at least one of the plurality of CSI reports,
- wherein if the plurality of CSI reports are CSI reports of the same type that utilize a Physical Uplink Control Channel (PUCCH), and if a multi-CSI-PUCCH resource list is configured by a higher layer, the plurality of CSI reports is multiplexed with a PUCCH resource configured by the multi-CSI-PUCCH resource list.

4. A base station comprising:
- a processor, wherein if transmission durations of a plurality of channel state information (CSI) reports overlap, the processor indicates, by configuring a multi-CSI-PUCCH resource list by a higher layer, to determine whether the plurality of CSI reports are multiplexed based on a report type of each CSI report and an uplink channel type used in transmission of each CSI report; and
- a receiver that receives at least one of the plurality of CSI reports,
- wherein if the plurality of CSI reports are CSI reports of the same type that utilize a Physical Uplink Control Channel (PUCCH), and if a multi-CSI-PUCCH resource list is configured by the higher layer, the processor indicates to multiplex the plurality of CSI reports with a PUCCH resource configured by the multi-CSI-PUCCH resource list.

5. A system comprising a terminal and a base station, wherein:
- the terminal comprises:
  - a first processor, wherein if transmission durations of a plurality of channel state information (CSI) reports overlap, then the first processor determines whether the plurality of CSI reports are multiplexed based on a report type of each CSI report and an uplink channel type used in transmission of each CSI report; and
  - a transmitter that transmits at least one of the plurality of CSI reports,
  - wherein if the plurality of CSI reports are CSI reports of the same type that utilize a Physical Uplink Control Channel (PUCCH), and if a multi-CSI-PUCCH resource list is configured by a higher layer, then the first processor multiplexes the plurality of CSI reports with a PUCCH resource configured by the multi-CSI-PUCCH resource list; and
- the base station comprises:
  - a second processor indicates, by configuring the multi-CSI-PUCCH resource list by the higher layer, to determine whether the plurality of CSI reports are multiplexed; and
  - a receiver that receives at least one of the plurality of CSI reports.

* * * * *